(12) United States Patent
Poorman

(10) Patent No.: US 6,666,805 B2
(45) Date of Patent: Dec. 23, 2003

(54) GROOVED TAPE GUIDE

(75) Inventor: Paul W. Poorman, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/324,443

(22) Filed: Dec. 19, 2002

(65) Prior Publication Data

US 2003/0087738 A1 May 8, 2003

Related U.S. Application Data

(63) Continuation of application No. 09/925,901, filed on Aug. 9, 2001, now Pat. No. 6,508,750.

(51) Int. Cl.⁷ .................................................. A01B 29/04
(52) U.S. Cl. ............................................ 492/35; 492/33
(58) Field of Search ............................. 492/30, 28, 31, 492/33, 34, 35; 29/895.3; 242/346.2, 615.4; 226/190, 193

(56) References Cited

U.S. PATENT DOCUMENTS

| | | | |
|---|---|---|---|
| 3,037,290 A | | 6/1962 | Dolby |
| 3,405,855 A | | 10/1968 | Daly et al. |
| 3,559,861 A | * | 2/1971 | Knox ......................... 226/168 |
| 4,310,863 A | | 1/1982 | Lelandais |
| 4,427,166 A | | 1/1984 | Oishi et al. |
| 4,466,582 A | | 8/1984 | Shiba |
| 5,088,172 A | | 2/1992 | Daly |
| 5,199,168 A | | 4/1993 | Daly |

FOREIGN PATENT DOCUMENTS

| | | |
|---|---|---|
| EP | 1 168 323 | 2/2002 |
| JP | 57 198568 | 6/1982 |

\* cited by examiner

Primary Examiner—Gregory Vidovich
Assistant Examiner—Marc Jimenez

(57) ABSTRACT

A tape guide that includes multiple spaced grooves or a spiral groove in the surface of the hub to bleed air from between the surface of the hub and the tape. The distance between adjacent grooves or turns in the case of a spiral groove is 2.4 to 3.7 times greater than the width of each groove or turn. For tape guides used with ½ inch type data storage tapes that have a nominal tape width of 12.65 mm, the grooves or turns are 0.30 mm to 0.38 mm wide and spaced 0.90 mm to 1.12 mm center to center.

14 Claims, 6 Drawing Sheets

GROOVED TAPE GUIDE

This application is a Continuation of application Ser. No. 09/925,901 filed Aug. 9, 2001 now U.S. Pat. No. 6,508,750.

FIELD OF THE INVENTION

The present invention relates generally to tape drives and, more particularly, to flanged tape guides that have a grooved surface to reduce the air bearing between the tape and the surface of the hub.

BACKGROUND OF THE INVENTION

Information is recorded on and read from a moving magnetic tape with a magnetic read/write head positioned next to the tape. The magnetic "head" may be a single head or, as is common, a series of read/write head elements stacked individually or in pairs within the head unit. Data is recorded in tracks on the tape by moving the tape lengthwise past the head. The head elements are selectively activated by electric currents representing the information to be recorded on the tape. The information is read from the tape by moving the tape longitudinally past the head elements so that magnetic flux patterns on the tape create electric signals in the head elements. These signals represent the information stored on the tape.

Data is recorded on and read from each of the parallel tracks on the tape by positioning the head elements at different locations across the tape. That is, head elements are moved from track to track as necessary to either record or read the desired information. Movement of the magnetic head is controlled by an actuator operatively coupled to some type of servo control circuitry. Tape drive head positioning actuators often include a lead screw driven by a stepper motor, a voice coil motor, or a combination of both. The carriage that supports the head is driven by the actuator along a path perpendicular to the direction the tape travels. The head elements are positioned as close to the center of a track as possible based upon the servo information recorded on the tape.

FIG. 1 illustrates generally the configuration of a tape drive 10 typical of those used with single spool tape cartridges. Referring to FIG. 1, a magnetic tape 12 is wound on a single supply spool 14 in tape cartridge 16. Tape cartridge 16 is inserted into tape drive 10 for read and write operations. Tape 12 passes around a first tape guide 18, over a magnetic read/write head 20, around a second tape guide 22 to a take up spool 24. Head 20 is mounted to a carriage and actuator assembly 26 that positions head 20 over the desired track or tracks on tape 12. Head 20 engages tape 12 as tape 12 moves across the face of head 20 to record data on tape 12 and to read data from tape 12. Referring to FIGS. 2 and 3, roller guide 28 includes disc shaped flanges 30 and an annular hub 32. Flanges 30 and hub 32 may be machined as a single integral part or as three separate parts bonded together. In either case, flanges 30 function to keep tape 12 at the proper angle as it passes across head 20. If the tape is presented to the head at too great an angle, then the read and write elements in the head may be misaligned to the data tracks. Flanges 30 are also needed to help keep tape 12 properly packed on take up spool 24.

As the tape is pulled over the guides, a film of air is created between the outside surface 34 of hub 32 and tape 12. This film is often referred to as an air bearing. The air bearing allows the tape to move with low friction very rapidly back and forth between flanges 30. Consequently, high frequency tape movement can occur when the edge of the tape bumps abruptly against flanges 30. Read/write head positioning systems have difficulty following such high frequency tape movement. It is desirable to reduce this air bearing and thereby increase the friction between the tape and the hub to slow the movement of the tape back and forth between the flanges. Slowing the tape in this manner would allow the head positioning system to better follow the tape as it wanders back and forth between the guide flanges.

U.S. patent application Ser. No. 09/597,882, filed Jun. 20, 2000 titled Irregular Surfaced Tape Guide, describes a tape guide in which grooves are formed in the surface of the hub to reduce the air bearing. The '882 Application discloses a preferred configuration for a ½" tape in which the grooves are 0.50 mm wide and spaced 1.50 mm on center. It has been discovered that this configuration may not perform as well as desired at higher tape speeds, tape speeds exceeding 4.1 m/s for example, due to instability in the spacing between the tape and the guide surface. At higher speeds, air is drawn in between the tape and the guide land. (The surface area of the guide between grooves is called the "land.") The tape is so flimsy that flapping occurs with the 1 mm land of the preferred configuration described in the '882 Application. The instability reduces the tracking ability of the guide, allowing the tape to wander back and forth between the guide flanges.

U.S. patent application Ser. No. 09/510,834 filed Feb. 23, 2000 title Improved Tape Guide discloses a tape guide designed to minimize the effect of the tape wandering back and forth between the flanges. The '834 Application describes a tape guide in which the corner geometry between the flanges and the hub prevents the tape from abruptly bumping the flange. The corners are rounded, chamfered or otherwise configured to apply progressively more force to the edge of the tape as the tape moves around the corner from the hub toward the flange. These corner configurations urge the tape more gently away from the flange at a much lower rate of acceleration. Guiding the tape in this manner results in smoother movement of the tape allowing the head positioning system to better follow the tape as it wanders back and forth between the guide flanges. This corner configuration requires flange spacing about 0.04 mm wider than the tape. The added spacing can lead to excessive tape tilt, where the tape passes at an angle across the head. Excessive tilt prevents the head from operating effectively in read-after-write mode. The added spacing also allows for increased debris build-up on the guide.

The present invention was developed to improve grooved tape guides for use in higher tape speed applications.

SUMMARY OF THE INVENTION

The present invention is directed to a tape guide that includes multiple spaced grooves or a spiral groove in the surface of the hub to bleed air from between the surface of the hub and the tape. In one exemplary embodiment of the invention, the distance between adjacent grooves, or turns in the case of a spiral groove, is 2.4 to 3.7 times greater than the width of each groove or turn. The grooves or turns are 0.30 mm to 0.38 mm wide and spaced 0.90 mm to 1.12 mm center to center. The enhanced stability of the narrower and more closely spaced grooves or turns allows for more narrow guide flange spacing. This closer spacing allows narrow flange spacing and reduces debris build-up. The narrowly and more closely spaced grooves or turns means more grooves or turns can be formed on the guide. More grooves or turns means lower contact pressure between the tape and the guide at the edge of the groove and, hence, less tape damage for the same tracking force.

Testing for ½ inch type data storage tapes nominally 12.65 mm wide and 9 μm thick indicates that the range of enhanced operating space is so small that groove widths of 0.40 mm and spacings of 1.25 mm do not work well. It is believed that the enhanced stability is achieved by keeping a shallow angle between the tape and the guide land as the tape rises from the groove on to the land. By carefully matching this angle with the land width, the tape can span the land without the air pocket alternately filling and then collapsing. By eliminating instability, the guide is able to function adequately at tape speeds up to 5.5 m/s.

DETAILED DESCRIPTION OF THE INVENTION

Figure 1:
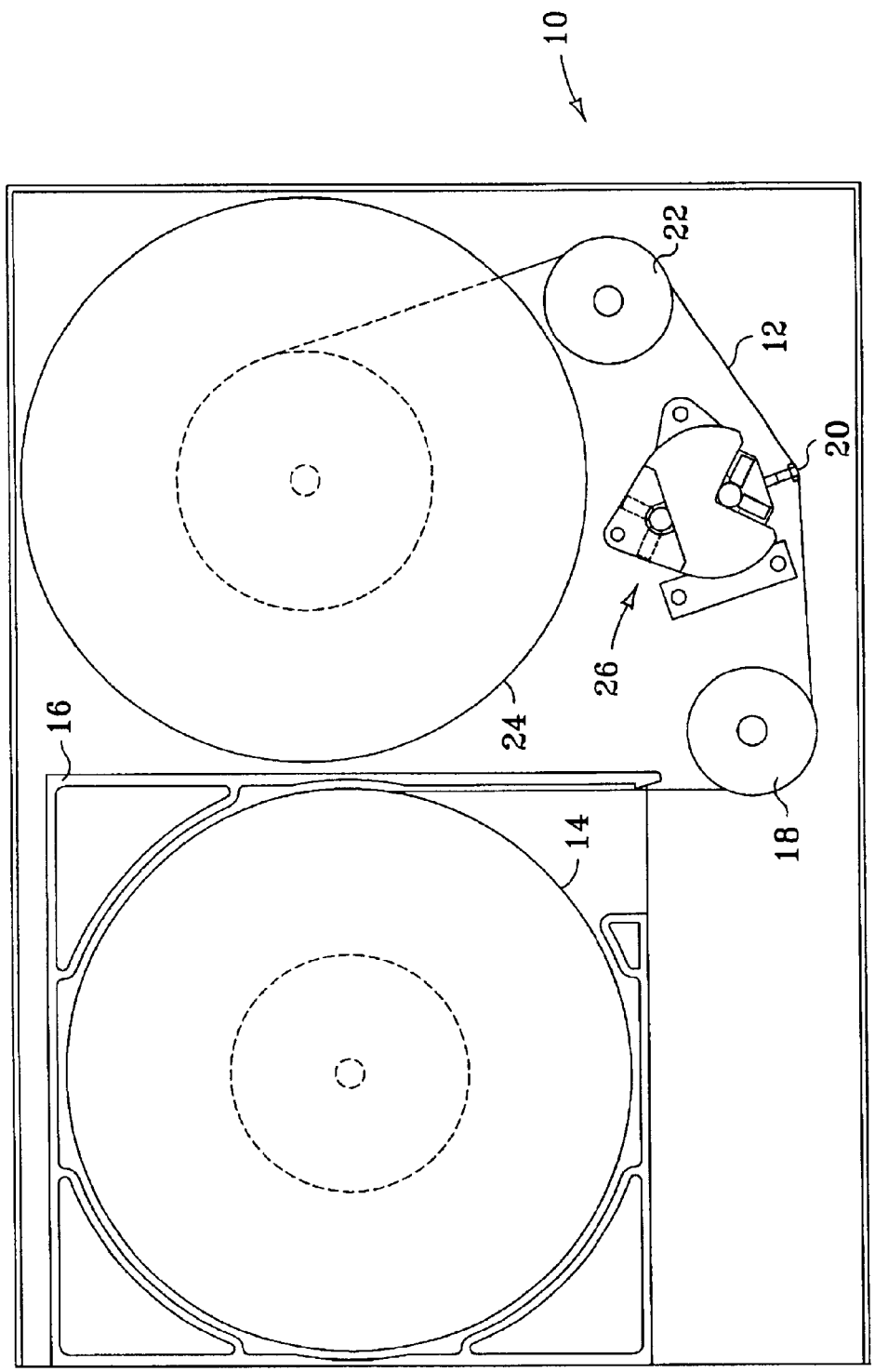
FIG. 1 is a top down plan view of a single spool tape drive.
Figure 2:
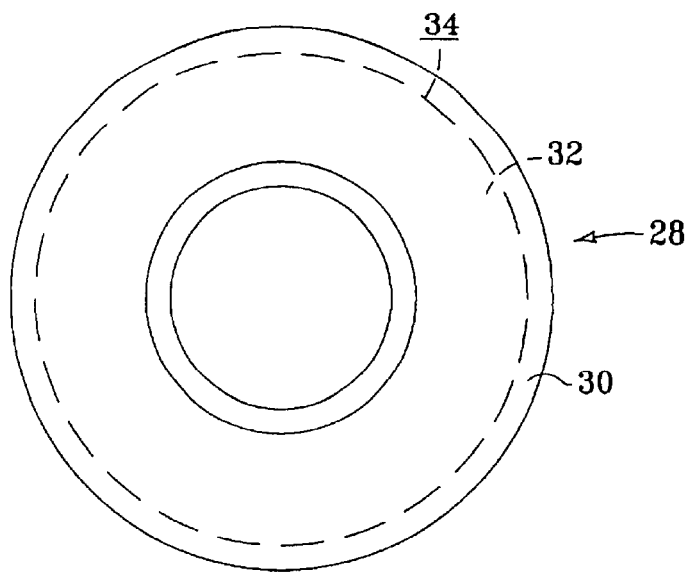
FIGS. 2 and 3 are plan and elevation views of a conventional roller tape guide.
Figure 3:
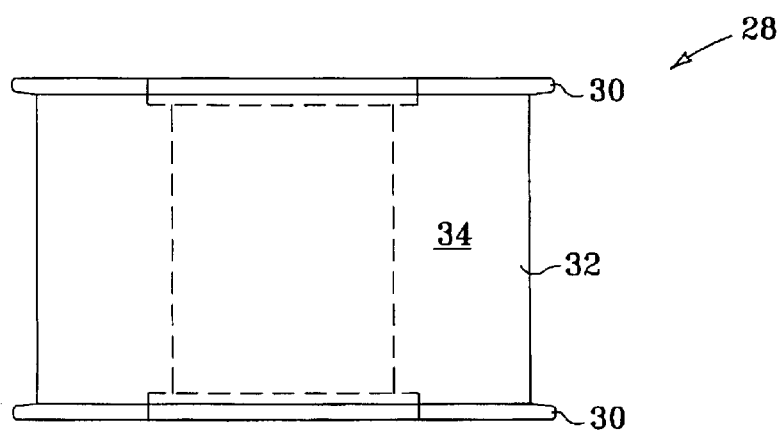

As noted above, FIG. 1 illustrates generally the configuration of a tape drive 10 typical of those used with single spool tape cartridges. Referring again to FIG. 1, a magnetic tape 12 is wound on a single supply spool 14 in tape cartridge 16. Tape cartridge 16 is inserted into tape drive 10 for read and write operations. Tape 12 passes around a first tape guide 18, over a magnetic read/write head 20, around a second tape guide 22 to a take up spool 24. Head 20 is mounted to a carriage and actuator assembly 26 that positions head 20 over the desired track or tracks on tape 12. Head 20 engages tape 12 as tape 12 moves across the face of head 20 to record data on tape 12 and to read data from tape 12.

Figure 4:
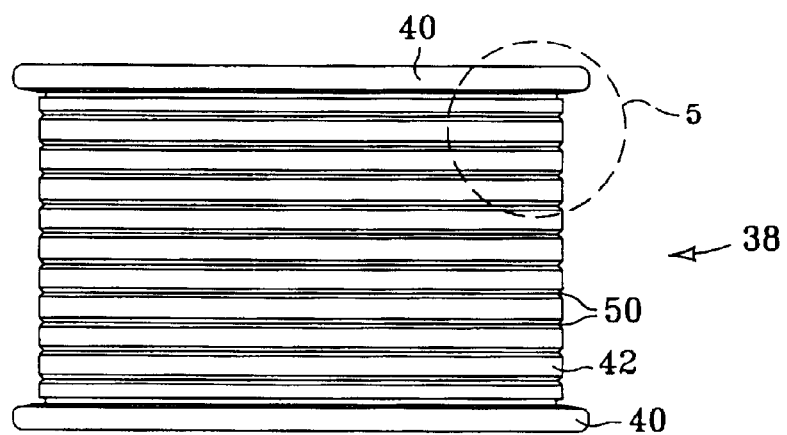
FIG. 4 is an elevation view of a roller tape guide constructed according to one embodiment in which concentric grooves are formed in the surface of the hub.
Figure 5:
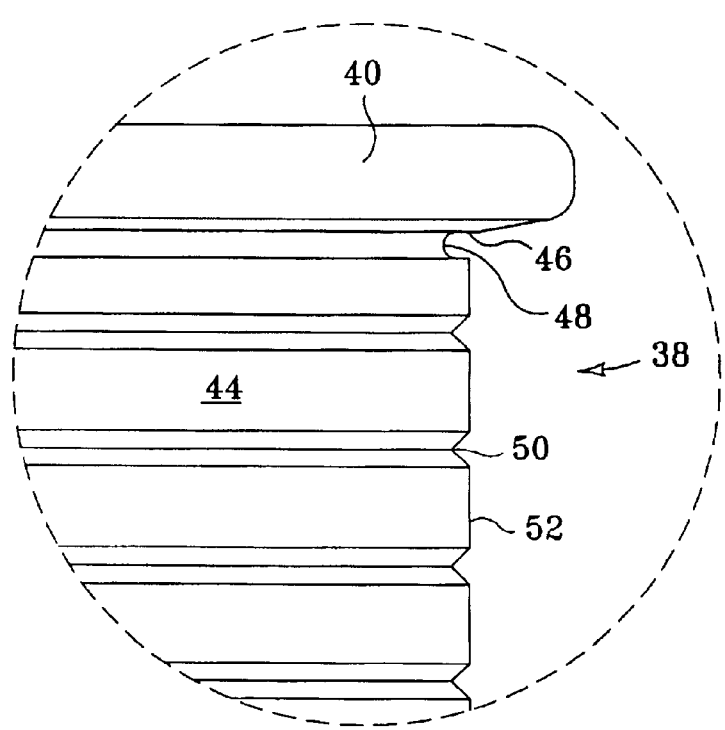
FIG. 5 is a detail view of a portion of the roller guide of FIG. 4 showing the grooves in more detail.

A tape guide constructed according to one embodiment of the present invention is shown in FIGS. 4–5. Referring to FIGS. 4–5, each roller guide 38 includes disc shaped flanges 40 and an annular hub 42. Tape 12 rides on the outer surface 44 of hub 42. Each flange 40 extends radially past outer surface 44 of hub 42. The corner between hub 42 and each flange 40 is usually formed at 90° or slightly greater than 90°. If the corner is greater than 90°, then a small flat area 46 is often used to make it easier to measure the spacing between flanges 40 at the corner. Also, because it is difficult to make a perfectly square corner, a small undercut relief 48 is often machined into the corner to help ensure a flat flange surface is presented to the tape at the corner. Although a simple radius relief 48 is shown, other relief geometries are possible including a facet-radius relief or a square cut.

Figure 6:
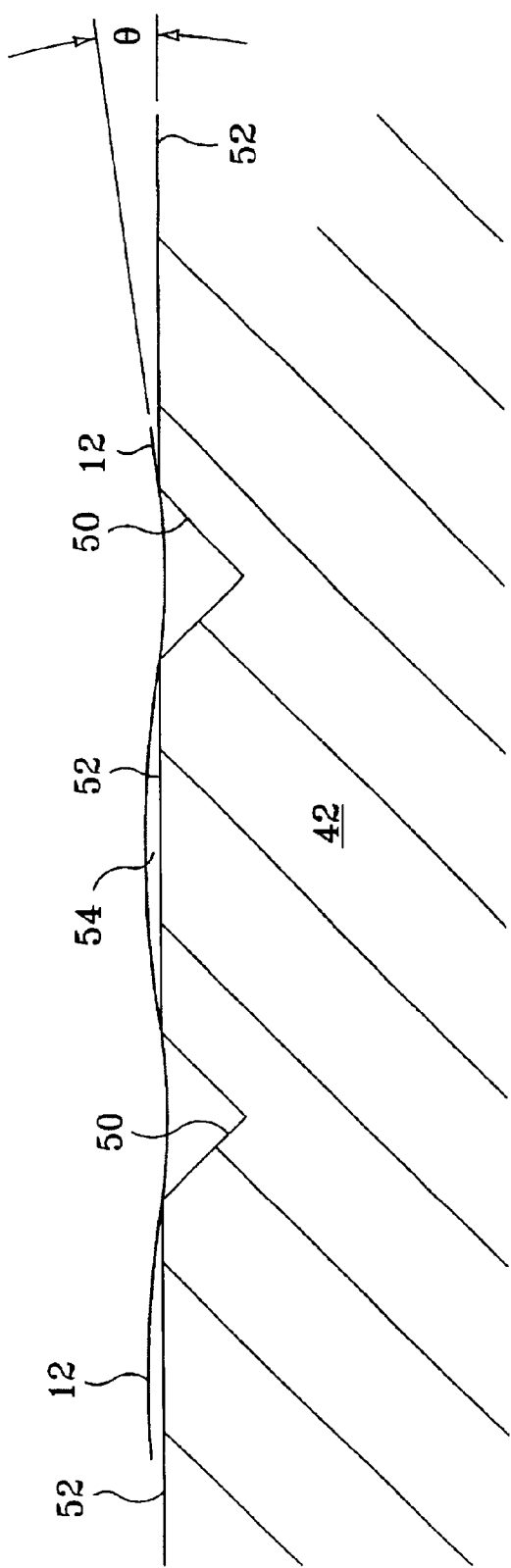
FIG. 6 is a detail section view showing a tape/hub surface interface at the grooves.

When roller guide 38 is installed in tape drive 10, for example as guides 18 and 22 in FIG. 1, hub 40 rotates on a fixed pin or axle that extends from the tape drive chassis or other suitable support through the center of hub 40. Concentric grooves 50 are formed in the outer surface 44 of hub 42 to bleed air from between tape 12 and hub surface 44. Grooves 50 are designed to allow some contact of tape 12 with hub surface 44 by reducing the air bearing. Referring now also to FIG. 6, which shows the tape/hub surface interface in detail, enhanced stability is achieved by keeping a shallow angle θ between tape 12 and land 52 as tape 12 rises from the edge of each groove on to land 52. By matching angle θ with the width of land 52, tape 12 can span land 52 without the air pocket 54 between tape 12 and land 52 alternately filling and then collapsing.

Figure 9:
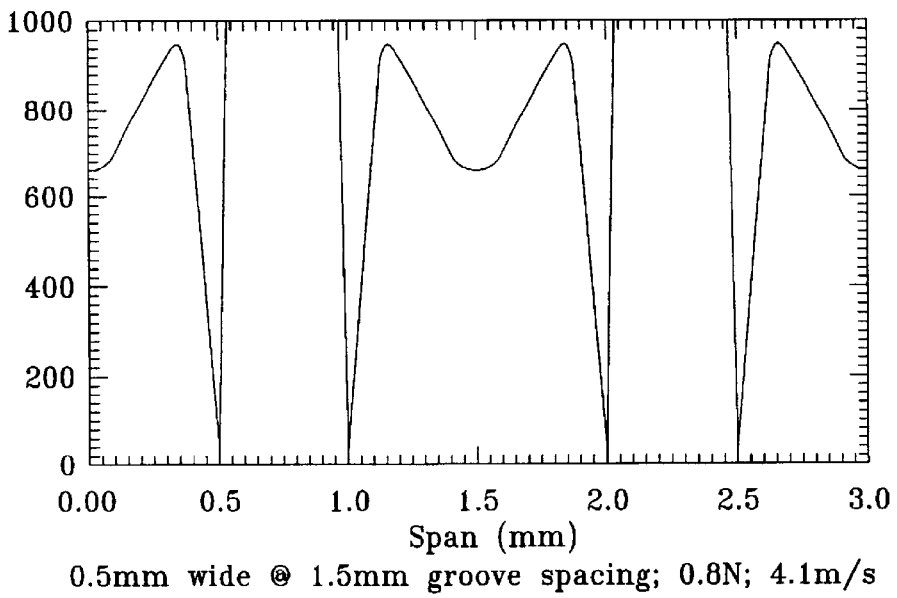
FIG. 9 is a graph illustrating the spacing between the tape and the surface of the hub for concentric grooves that are 0.50 mm wide and spaced 1.5 mm on center.
Figure 10:
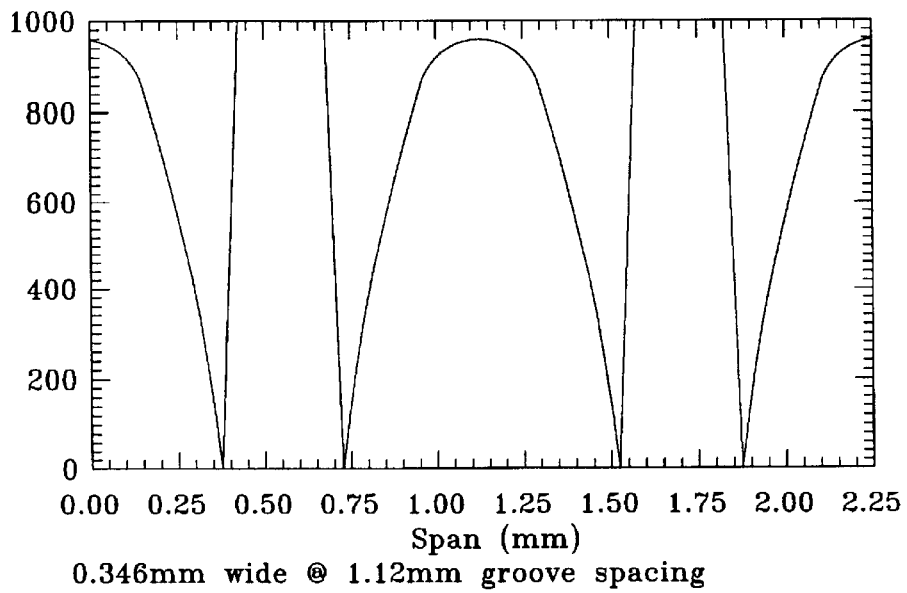
FIG. 10 is a graph illustrating the spacing between the tape and the surface of the hub for concentric grooves that are 0.346 mm wide and spaced 1.12 mm on center.

The graphs of FIGS. 9 and 10 illustrate the performance differences between the grooves of the preferred configuration described in the '882 Application and the more narrow closely spaced grooves of the present invention. FIG. 9 shows the spacing between tape 12 and hub surface 44 laterally across tape 12 for grooves that are 0.50 mm wide and spaced 1.50 mm on center. At a span of 0.5 mm and 1.0 mm, which are the edges of the first groove, the spacing goes to 0 as the tape contacts the edges of the groove. Between a span of 1.0 mm and 2.0 mm, which is the land between the first two grooves, the spacing rises sharply to about 950 nm, then collapses to about 700 nm and rises again to about 950 nm before dropping down to 0 where the tape contacts the edge of the second groove at a span of 2.0 mm. Tape 12 collapses or "droops" between each groove. At high tape speeds, exceeding 4.1 ms for example, the droop area alternately collapses and ballons leading to unstable performance. FIG. 10 shows the spacing between tape 12 and hub surface 44 laterally across tape 12 for grooves that are 0.346 mm wide and spaced 1.12 mm on center. In FIG. 10, the spacing rises more gradually from the edge of each groove (e.g., at a span of 0.75 mm) up over the intervening land (0.75 mm span to 1.50 mm span), does not collapse over the land and then returns gradually to the edge of the next groove (1.50 mm span).

For ½ inch type data storage tapes nominally 12.65 mm wide and 9 μm thick, grooves 0.30 mm to 0.38 mm wide and spaced 0.90 mm to 1.12 mm center to center are necessary to achieve enhanced stability at high tape speeds compared to that of the configuration described in the '882 Application. Testing suggests a groove width of 0.35 mm and center to center spacing of 1.12 mm provides optimum tape stability. Although the depth and shape of grooves 50 is not as critical to performance as the width and spacing of the grooves, V shaped grooves about 0.175 mm deep provide adequate performance. Preferably, the depth of the grooves is not greater than the width of the grooves. The grooves should not, an any event, be more than 0.50 mm deep for ½ inch tape with the groove width and spacing described above. V shaped grooves are preferred because they are easy to machine. Other groove geometries are possible, however, including square bottom, trapezoidal or filleted.

Figure 7:
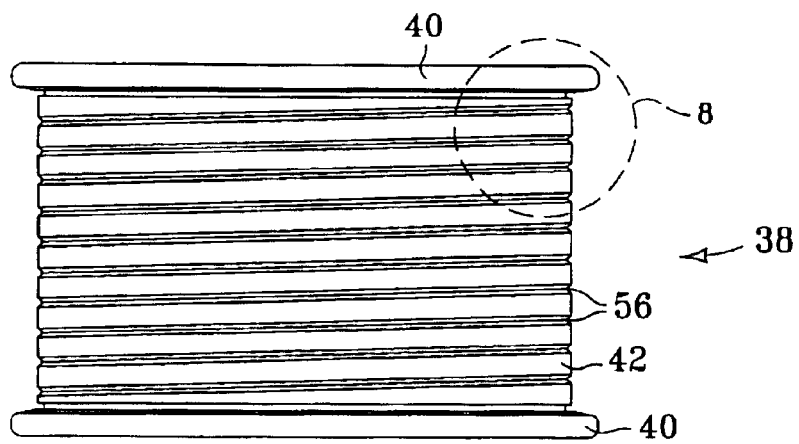
FIG. 7 is an elevation view of a roller tape guide constructed according to another embodiment of the present invention in which a spiral groove is formed in the surface of the hub.
Figure 8:
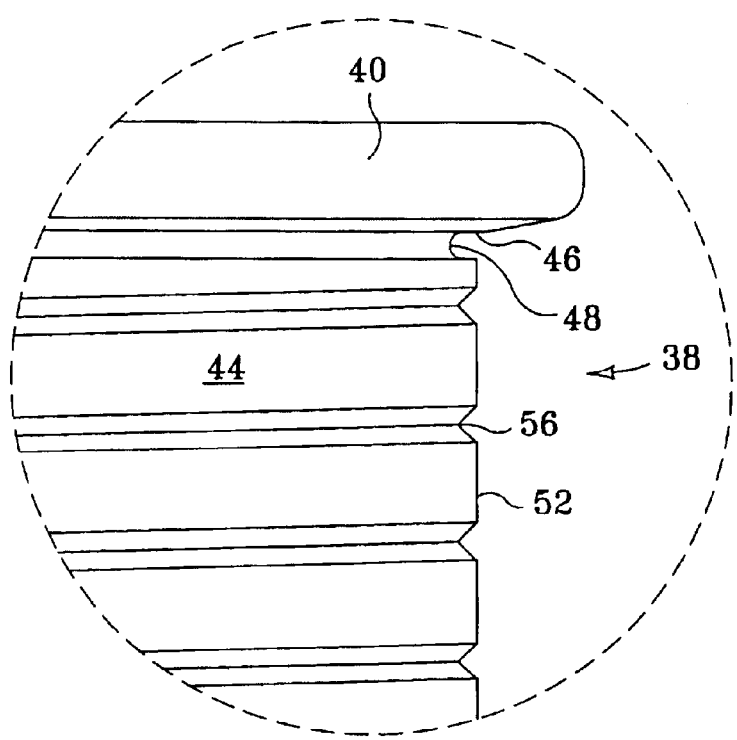
FIG. 8 is a detail view of a portion of the roller guide of FIG. 6 showing the groove in more detail.

FIGS. 7 and 8 illustrate an alternative embodiment in which a spiral groove 56 is formed in hub surface 44. The configuration of spiral groove 56 is the same as that of the concentric grooves 50 described above. For ½ inch type data storage tapes that have a nominal tape width of 12.65 mm, groove 56 is 0.30 mm to 0.38 mm wide and the pitch of the spiral is such that adjacent turns of the groove are spaced 0.90 mm to 1.12 mm center to center. Again, a groove width of 0.35 mm and center to center spacing of 1.12 mm provides optimum tape stability. A spiral groove is preferred over multiple grooves because it is easier to machine and is less likely to damage the tape.

While the invention has been shown and described with reference to the foregoing exemplary embodiment, other embodiments are possible. It should be understood, therefore, that variations of and modifications to the embodiments shown and described may be made without departing from the spirit and scope of the invention which is defined in following claims.

What is claimed is:

1. A tape guide, comprising:
   a hub having a surface over which a tape passes, the surface being sufficiently broad to accommodate the tape with an approximately 0.5 inch width; and
   a pair of spaced, parallel flanges extending radially out from the hub, wherein the hub comprises a plurality of grooves formed in the surface between the pair of spaced, parallel flanges, each groove being 0.30 mm to 0.38 mm wide and spaced from a next adjacent groove 0.90 mm to 1.12 mm as measured from the center of each groove to the center of the next adjacent groove.

2. The tape guide of claim 1, wherein each groove is 0.35 mm wide and spaced apart nominally 1.12 mm as measured from the center of each groove to the center of the next adjacent groove.

3. The tape guide of claim 1, wherein the plurality of grooves are arranged in parallel.

4. The tape guide of claim 1, wherein each groove is generally V-shaped.

5. The tape guide of claim 1, wherein each groove has a depth less than 0.50 mm deep.

6. A tape guide, comprising:
   a hub having a surface over which a tape passes; and
   a plurality of parallel flanges extending out radially from the hub, wherein the hub comprises a spiral groove in the surface, the spiral groove being 0.30 mm to 0.38 mm wide and having a pitch such that adjacent turns of the groove are spaced apart 0.90 mm to 1.12 mm as measured from the center of one turn to the center of an adjacent turn.

7. The tape guide of claim 6, wherein the groove comprises a spiral groove about 0.35 mm wide and having a pitch such that adjacent turns of the groove are spaced apart 1.12 mm as measured from the center of one turn to the center of an adjacent turn.

8. The tape guide of claim 6, wherein the surface is sufficiently wide to accommodate the tape having a width of approximately 0.5 inches.

9. The tape guide of claim 6, wherein the spiral groove is V-shaped.

10. A system for utilizing a magnetic tape, comprising:
    a tape drive having a tape guide, the tape guide comprising a hub axially bounded by a pair of flanges extending radially from the hub, the hub further comprising a plurality of grooves between the pair of flanges, each groove being 0.30 mm to 0.38 mm wide and spaced from a next adjacent groove 0.90 mm to 1.12 mm as measured from the center of each groove to the center of the next adjacent groove.

11. The system as recited in claim 10, wherein each groove is 0.35 mm wide and spaced apart nominally 1.12 mm as measured from the center of each groove to the center of the next adjacent groove.

12. The tape guide of claim 10, wherein the plurality of grooves are arranged in parallel.

13. A system for utilizing a magnetic tape, comprising:
    a tape drive having a tape guide, the tape guide comprising a plurality of parallel flanges extending out radially from the hub, wherein the hub comprises a spiral groove in the surface, the spiral groove being 0.30 mm to 0.38 mm wide and having a pitch such that adjacent turns of the groove are spaced apart 0.90 mm to 1.12 mm as measured from the center of one turn to the center of an adjacent turn.

14. The tape guide of claim 13, wherein the groove comprises a spiral groove about 0.35 mm wide and having a pitch such that adjacent turns of the groove are spaced apart 1.12 mm as measured from the center of one turn to the center of an adjacent turn.

* * * * *